US012609604B2

(12) United States Patent
Song et al.

(10) Patent No.: US 12,609,604 B2
(45) Date of Patent: Apr. 21, 2026

(54) SINGLE-PHASE VOLTAGE SOURCE INVERTER CIRCUIT WITH POWER FILTER REDUCTION

(71) Applicants: Guanghong Song, Nanchang (CN); Bo Cao, Fredericton (CA); Hassan A. Hassan, Fredericton (CA); Liuchen Chang, Fredericton (CA)

(72) Inventors: Guanghong Song, Nanchang (CN); Bo Cao, Fredericton (CA); Hassan A. Hassan, Fredericton (CA); Liuchen Chang, Fredericton (CA)

( * ) Notice: Subject to any disclaimer, the term of this patent is extended or adjusted under 35 U.S.C. 154(b) by 166 days.

(21) Appl. No.: 18/377,757

(22) Filed: Oct. 6, 2023

(65) Prior Publication Data

US 2025/0119051 A1     Apr. 10, 2025

(51) Int. Cl.
| | |
|---|---|
| *H02M 1/12* | (2006.01) |
| *H02M 7/537* | (2006.01) |
| *H02M 7/5387* | (2007.01) |

(52) U.S. Cl.
CPC ............ *H02M 1/126* (2013.01); *H02M 7/537* (2013.01); *H02M 7/5387* (2013.01)

(58) Field of Classification Search
CPC ..... H02M 1/126; H02M 7/537; H02M 7/5387
See application file for complete search history.

(56) References Cited

U.S. PATENT DOCUMENTS

| | | | |
|---|---|---|---|
| 9,571,005 B2 * | 2/2017 | Pahlevaninezhad | ........................ H02M 7/5387 |
| 9,935,562 B2 * | 4/2018 | Eren | ...................... H02M 1/126 |
| 10,381,950 B2 * | 8/2019 | Bojarski | ............... H02M 7/537 |
| 11,012,002 B1 * | 5/2021 | Xu | ....................... H02M 7/5387 |

OTHER PUBLICATIONS

Irena (2019), Global energy transformation: A roadmap to 2050 (2019 edition), International Renewable Energy Agency (Irena), Abu Dhabi.
A. Jager-Waldau, PV Status Report 2019, EUR 29938 EN, Publications Office of the European Union, Luxembourg, 2019, ISBN 978-92-76-12608-9, doi: 10.2760/326629, JRC118058.
Irena (2021), Renewable capacity statistics 2021, International Renewable Energy Agency (Irena), Abu Dhabi.
Irena (2015), Battery Storage for Renewables : Market Status and Technology Outlook, International Renewable Energy Agency (Irena), Ruud Kempener (Irena) and Eric Borden.

(Continued)

*Primary Examiner* — Gary A Nash
(74) *Attorney, Agent, or Firm* — Eugene Derenyi; Fogler, Rubinoff LLP

(57) ABSTRACT

A single-phase voltage source inverter and method including a main inverter circuit connected to an active power filter circuit, the main inverter circuit comprising an H-bridge circuit comprising a first leg and a second leg, the first leg comprising a first switch, a second switch, and the second leg comprising a third switch and a fourth switch, the active power filter circuit comprising a third leg comprising a fifth switch and a sixth switch, the main inverter circuit connected to a secondary side of a high frequency transformer and a grid filter in series, and adapted to be connected to an AC load, a primary of the high frequency transformer and a capacitor connected in series to the active power filter leg and an H-bridge leg.

3 Claims, 14 Drawing Sheets

(56) References Cited

OTHER PUBLICATIONS

IEA (2021), Global EV Outlook 2021, IEA, Paris https://www.iea.org/reports/global-ev-outlook-2021.

B. Mirafzal and A. Adib, "On Grid-Interactive Smart Inverters: Features and Advancements," IEEE Access, vol. 8, pp. 160526-160536, Sep. 2020.

M. Bajaj and A. K. Singh, "Grid Integrated Renewable DG Systems: A Review of Power Quality Challenges and State-of-the-Art Mitigation Techniques," Int. J. Energy Res., vol. 44, No. 1, pp. 26-69, Jan. 2020.

Underwrit. Lab., UL 1741 Supplement SA: Grid Support Utility Interactive Inverters and Converters, 2016.

IEEE 1547-2018: IEEE Standard for Interconnection and Interoperability of Distributed Energy Resources with Associated Electric Power Systems Interfaces, IEEE Std 1547, 2018.

Y. Liu, K.-Y. See, S. Yin, R. Simanjorang, C. F. Tong, A. Nawawi and J. - S. Lai., "LCL Filter Design of a 50-kW 60-kHz SiC Inverter with Size and Thermal Considerations for Aerospace Applications," IEEE Trans. Ind. Electron., vol. 64, No. 10, pp. 8321-8333, Oct. 2017.

D. Solatialkaran, K. G. Khajeh, and F. Zare, "A Novel Filter Design Method for Grid-Tied Inverters," IEEE Trans. Power Electron., vol. 36, No. 5, pp. 5473-5485, May 2021.

S. Jayalath and M. Hanif, "Generalized LCL-Filter Design Algorithm for Grid-Connected Voltage-Source Inverter," IEEE Trans. Ind. Electron., vol. 64, No. 3, pp. 1905-1915, Mar. 2017.

D. Solatialkaran, F. Zare, T. K. Saha, and R. Sharma, "A Novel Approach in Filter Design for Grid-Connected Inverters Used in Renewable Energy Systems," IEEE Trans. Sustain. Energy, vol. 11, No. 1, pp. 154-164, Jan. 2020.

S. Jiang, Y. Liu, Z. Mei, J. Peng, and C. M. Lai, "A Magnetic Integrated LCL-EMI Filter for a Single-Phase SiC-MOSFET Grid-Connected Inverter," IEEE J. Emerg. Sel. Top. Power Electron., vol. 8, No. 1, pp. 601-617, Mar. 2020.

Y. Yang, "A Design of PWM Inverter Passive Filter Based on CM Transformer," CPSS Trans. Power Electron. Appl., vol. 5, No. 2, pp. 180-190, Jun. 2020.

J. Koppinen, F. M. M. Rahman, and M. Hinkkanen, "Effects of the Switching Frequency of a Grid Converter on the LCL Filter Design," in 8th IET International Conference on Power Electronics, Machines and Drives (PEMD 2016), Glasgow, UK, Apr. 2016.

Y. Zhang, H. Li, and Y. Shi, "Electromagnetic Interference Filter Design for a 100 kW Silicon Carbide Photovoltaic Inverter Without Switching Harmonics Filter," IEEE Trans. Ind. Electron., vol. 69, No. 7, pp. 6925-6934, Jul. 2022.

W. Chen, X. Yang, and Z. Wang, "An Active EMI Filtering Technique for Improving Passive Filter Low-Frequency Performance," IEEE Trans. Electromagn. Compat., vol. 48, No. 1, pp. 172-177, Feb. 2006.

Y. Chu and Y. Ramadass, "Active EMI Filters to Reduce Size and Cost of EMI Filters in Automotive Systems," Power Analog Des. J., Adj 3Q, pp. 1-5, 2021.

S. Jiang, Y. Liu, W. Liang, J. Peng, and H. Jiang, "Active EMI Filter Design with a Modified LCL-LC Filter for Single-Phase Grid-Connected Inverter in Vehicle-to-Grid Application," IEEE Trans. Veh. Technol., vol. 68, No. 11, pp. 10639-10650, Nov. 2019.

S. Ogasawara, H. Ayano, and H. Akagi, "An Active Circuit for Cancellation of Common-Mode Voltage Generated by a PWM Inverter," IEEE Trans. Power Electron., vol. 13, No. 5, pp. 835-841, Sep. 1998.

S. Ohara, S. Ogasawara, M. Takemoto, K. Orikawa, and Y. Yamamoto, "An Active Common-Noise Canceler Combined with Feedback Control," Electron. Commun. Japan, vol. 104, No. 2, p. e12305, Jun. 2021.

L. Wang, Y. Shi, and H. Li, "Anti-EMI Noise Digital Filter Design for a 60-kW Five-Level SiC Inverter Without Fiber Isolation," IEEE Trans. Power Electron., vol. 33, No. 1, pp. 13-17, Jan. 2018.

G. D. S. Fischer, A. Mengatto, L. G. Kremer, and M. Mezaroba, "A Control Strategy for a Series APF with Critical-Load-Bus Voltage Feedback That Avoids Injection Transformer Saturation," IEEE Trans. Ind. Appl., vol. 55, No. 3, pp. 2290-2299, May 2019.

W. H. Ko and J. C. Gu, "Impact of Shunt Active Harmonic Filter on Harmonic Current Distortion of Voltage Source Inverter-Fed Drives," IEEE Trans. Ind. Appl., vol. 52, No. 4, pp. 2816-2825, Jul. 2016.

S. Devassy and B. Singh, "Design and Performance Analysis of Three-Phase Solar PV Integrated UPQC," IEEE Trans. Ind. Appl., vol. 54, No. 1, pp. 73-81, Jan. 2018.

Kim, S.-P.; Song, S.-G.; Park, S.-J.; Kang, F.-s. Output Voltage Imbalance Compensation Using dc Offset Voltage for Split dc-Link Capacitor 3-Leg Inverter. Electronics 2021, 10, 1029. https://doi.org/10.3390/electronics10091029.

* cited by examiner $rf$ $cf$

50

Total Harmonic Distortion (THD)

Grid Voltage THD            Grid Current THD

SINGLE-PHASE VOLTAGE SOURCE INVERTER CIRCUIT WITH POWER FILTER REDUCTION

FIELD

In one of its aspects, the present disclosure relates generally to single-phase grid-connected inverters, and inverter power filter reduction in particular.

BACKGROUND

With increasing awareness of environmental issues and the demand for clean energy, distributed energy resources (DERs) have achieved rapid growth in modern power systems during the past decades [1]. In distribution grids, DERs including distribution generation (DG) units such as photovoltaics (PV) [2] and wind systems [3], and energy storage units such as battery energy storage systems (BESS) [4] and electric vehicles (EV) [5] have already been an essential part. In order to regulate the operation of these DERs for optimized power production and meet grid interconnection standards, single-phase grid-connected DER inverters have played important roles in these applications [6], [7]. With more and more inverters connected into the power system, power quality and total harmonics distortion (THD) have become a critical aspect when investigating the performance of these inverters-considering the fact that all of the inverters perform power conversion from DER sources to the distribution grid using some switching techniques such as pulse width modulation (PWM), etc., which generates harmonics during their normal operation. In order to satisfy the THD requirement set by grid interconnection standards [8], [9], a well-designed power filter is therefore required in the inverter to minimize the injected harmonics into the distribution grid. However, in practical inverter applications, the need of power filters which traditionally are made of passive components such as inductors (L) and capacitors (C) makes it difficult to minimize the size of these inverters for power density improvements. Even though the size criteria of these power filters aren't usually emphasized as the main research focuses, the reduction of the power filter is still a key point in evaluating the benefit of filters [10].

Various LC-based power filters have been designed for the filtering out these harmonics and for minimizing their sizes which use inductors and capacitors with different circuit structures to serve their filtering operations. Among these inverter applications, the L-type and the LCL-type filters have been widely known for their effectiveness and simplicity [11], [12]. The L-type filter is a first-order filter known for its simple structure which uses only an inductor. Although the L-type filter has been proven to be effective in filtering these switching ripples and harmonics, there exists a trade-off between its dynamic performance and the size of the inductor where a relatively large inductor is always required in order to satisfy THD requirements of the grid standards [11]. On the other hand, the LCL-type filter, which is a third-order filter using inductors and capacitors, has better performance compared to the L-type filter for its resonant characteristics in filtering the harmonics [12]. Apart from the L-type and LCL-type filters, various improvements and optimizations based on these two filters have also been made in recent literature such as: optimizing filter design [13], improvement of filter stability criteria [13], as well as advanced LC-based filters [14], [15], etc. However, all of the mentioned filters above are designed based on the combination of passive components of inductors and capacitors which, as stated in [11], always exists a trade-off between the ripples' attenuation and the size of the inductor.

In addition to these LC-based filters, other approaches have also been proposed in recent literature with the benefit of power filter reduction. The use of wide bandgap (WBG) devices has been verified to be the most effective method in size reduction of grid filters as well as power density improvements [16]. By increasing the switching frequency of the inverter through WGB devices, the size of power filters can be significantly reduced. Even though the required power filter can be reduced by using WGB devices with the increased switching frequency, there exist some design issues such as: electro-magnetic interference (EMI) issues, the modification of new control circuit and components with the high switching frequency, etc., which limit their application in practical inverters [17].

The active filtering technique has also been used for ripple filtering purposes in recent research, which also leads to the reduction of power filter size. In [18], an analog-based active EMI filter (AEF) using an op-amp circuit was proposed to cancel the noise in the current through negative current injection. Although this method is originated for grid noise cancellation, minor modifications make it possible for using this method in inverter applications for switching ripple cancellation [19], [20]. However, due to the use of an analog op-amp, this AEF method has operation limitations with high power applications. On the other hand, switching-based active power filters (APF), as discussed in [21]-[26], have also been proposed for ripple cancelling purposes. Active power filters are filters which can perform the job of harmonic elimination using power semiconductor devices. Active power filters can be used to filter out harmonics in the power system which are significantly below the switching frequency of the filter. In [21]-[23], active common-noise cancelers (ACC) were proposed for three-phase applications to minimize the EMI ripples with additional half- and full-bridge switching circuits. Meanwhile, series APF (SeAPF) [24], shunt APF (SAPF) as well as unified power quality conditioner (UPQC) were also proposed for voltage and current harmonics suppression with nonlinear loads. However, the former ACC-based methods require a relatively large number of additional components while the latter APF methods are mainly targeting low-frequency harmonics. Neither of these methods can be directly used for inverters' grid filter reduction purposes and thus require further modifications.

SUMMARY

The present disclosure, in one aspect, relates to a 3-leg inverter topology for single-phase grid-connected inverters to reduce the relative size of the power filters so that the overall power density can be improved. Using an active power filtering method, desired voltage pulses are generated in the third leg, which is then used to counteract the PWM ripples from the main inverter legs. By minimizing these PWM ripples, a relatively smaller grid filter can be used at a cost of additional switching devices. In one aspect, the third APF leg is given identical PWM pulses to the ones of the main legs.

The present disclosure in another aspect, relates to a single-phase voltage source inverter including a main inverter circuit connected to an active power filter circuit, the main inverter circuit comprising an H-bridge circuit comprising a first leg and a second leg, the first leg comprising a first switch, a second switch, and the second leg comprising a third switch and a fourth switch, the active power filter circuit comprising a third leg comprising a fifth switch and a sixth switch, the main inverter circuit connected to a secondary side of a high frequency transformer and a grid filter in series, and adapted to be connected to an AC load, a primary of the high frequency transformer and a capacitor connected in series to the active power filter leg and an H-bridge leg.

The present disclosure in another aspect, relates to a method of power filter reduction using the above inverter, including charging and discharging the high frequency transformer primary and the capacitor by controlling the switches of the active power filter circuit to generate an induced voltage on the transformer secondary which is in opposite phase with the pulses generated by the switches of the main inverter circuit. In one aspect, the charging and discharging the active power filter circuit includes the steps of the first, fourth and fifth switches turned on and the second, third and sixth switches turned off; followed by the first, third and fifth switches turned on and the second, fourth and sixth switch turned on. followed by the first, fourth and fifth switches turned on and the second, third and sixth switches turned off, followed by the first, third and fifth switches turned off and the second, fourth and sixth switched turned on.

BRIEF DESCRIPTION OF THE DRAWINGS

Embodiments of the present invention will be described with reference to the accompanying drawings, wherein like reference numerals denote like parts, and in which.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figure 9:
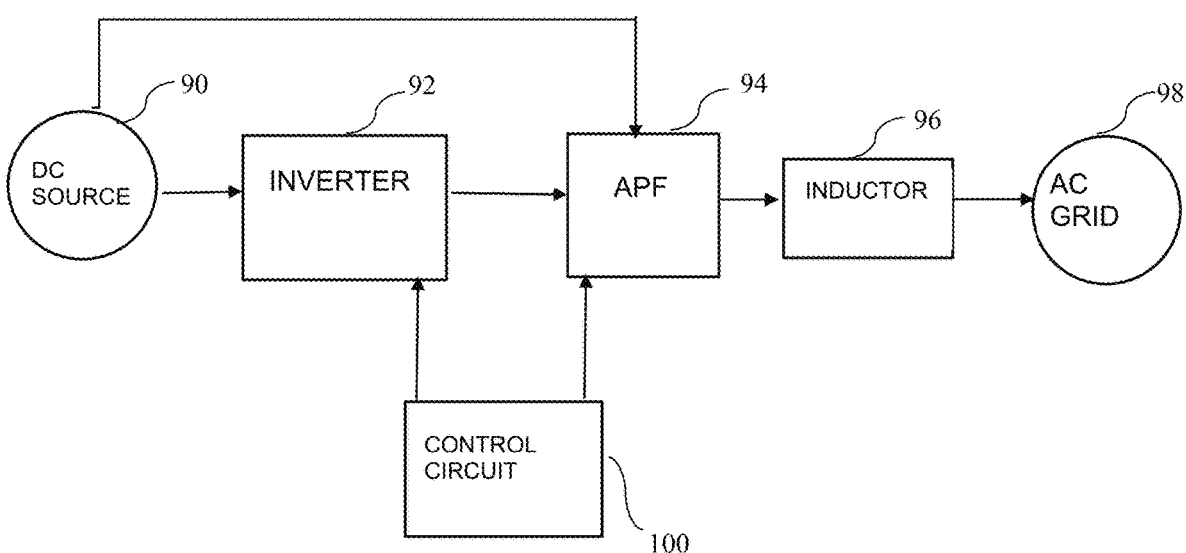
FIG. 9 is a simplified block diagram of one embodiment of a system for converting DC power to AC power.

Referring to FIG. 9, in one embodiment, a system for converting DC power to AC power includes inverter 92 electrically coupled to active power filter 94, active power filter 94 electrically coupled to inductor 96, inductor 96 electrically coupled to AC load 98 which may be an AC grid. DC source is electrically coupled to inverter 92 and also to active power filter 94. Control circuit 100 is electrically coupled to inverter 92 and active power filter 94 to control operations thereof, including operation of switches therein. In one particular embodiment, control circuit 100 is configured to execute an algorithm to provide a plurality of control signals to the switches of inverter 92 and active power filter 94 as further described in more detail below.

Figure 10:
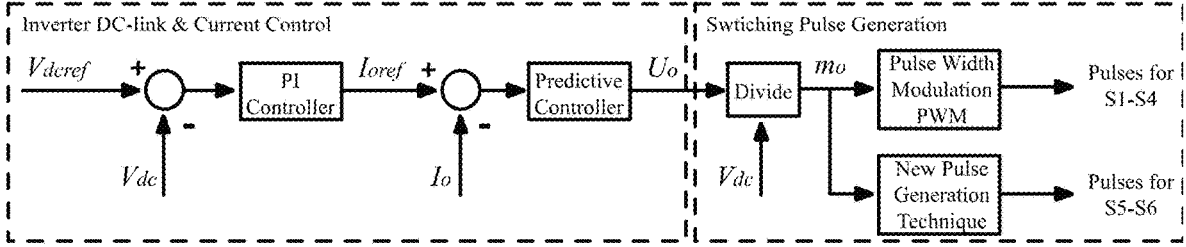
FIG. 10 is a control diagram for one embodiment of the inverter.

Referring to FIG. 10, a control block diagram of the inverter according to one embodiment is shown, including the control stage regulating the output current of the inverter and the modulation stage generating the pulses for all switches S1-S6 from the control output. In the control stage, a proportional-integral (PI) controller and a predictive controller are employed to maintain a constant DC-link voltage and to regulate the output current of the inverter following a current reference. Other types of control algorithms may also be used. Meanwhile, the modulation stage generates the pulses according to the control output controlling switches S1-S6. In the proposed topology, switches S1-S4 are operated under conventional PWM scheme generating pulsed voltage while switches S5-S6 are controlled by the proposed pulse generation method performing active power filtering by producing the ripples in opposite to those of inverter PWM output generated by switches S1-S4. Under this control block diagram, the control stage and the modulation stage for S1-S4 may be the same as a conventional single-phase bridge inverter. With the APF leg (S5-S6) and the associated pulse generation method as proposed, active filtering can be achieved which helps reduce the power filter and improve the power density of the inverter system.

To mitigate output harmonics with minimizing the relative size of passive power filters for grid-connected inverters, a 3-leg inverter topology is proposed in this disclosure which integrates switching-based active power filtering (APF) techniques into conventional single-phase H-bridge inverter systems. In the proposed topology, the H-bridge legs are responsible for power delivery operations which is identical to a conventional inverter. Meanwhile, the additional switching-based APF leg is responsible for performing active power filtering and reduces the voltage ripples in the PWM voltage generated by the H-bridge legs, which leads to the reduction of the power filter in this inverter system. The effectiveness of the proposed topology is verified based on theoretical analysis, detailed circuit analysis in each switching state, and simulation and experimental verifications on a MATLAB/SIMULINK platform and on a 3-leg inverter prototype.

The remainder of this detailed description is organized as follows: theoretical analysis of the proposed topology, a detailed circuit analysis with switching technique, and simulation comparisons and experimental validations.

Figure 1:
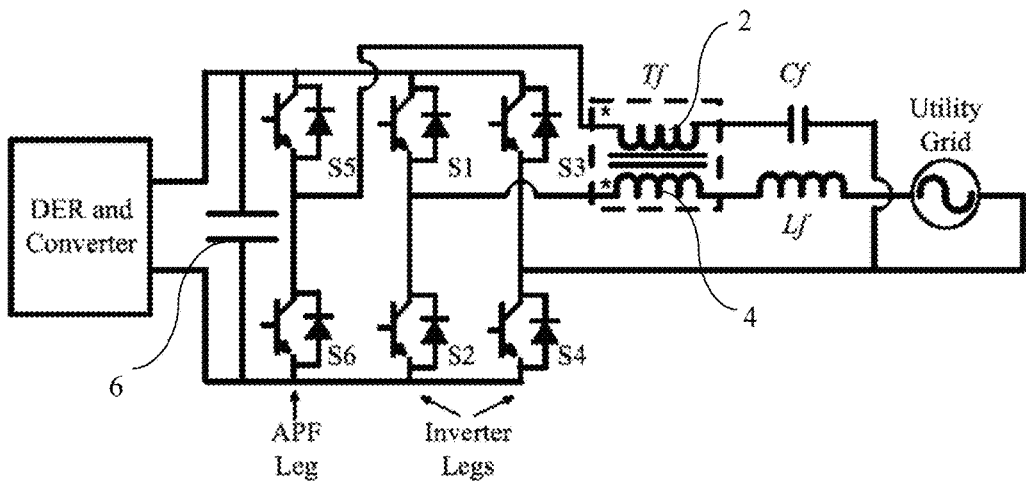
FIG. 1 is a circuit layout of topology according to an embodiment of the present invention.

Aiming to minimize the relative size of the power filter for power density improvement, a novel inverter topology, which integrates the APF technique into a conventional H-bridge inverter, is proposed and explained in this disclosure. The circuit layout of the proposed inverter topology is shown in FIG. 1 where switches S1-S4 operate as a conventional H-bridge inverter for normal power delivery operation, which are called main inverter legs. Meanwhile, switches S5-S6 in the third leg are responsible for active power filtering operation, which is called the APF leg in this disclosure, $T_f$, $C_f$ and $L_f$ are the components in the proposed topology which represent a high-frequency transformer, a capacitor, and a L-type power filter, respectively. In one embodiment, the high-frequency transformer includes a primarily winding 2 and a secondary winding 4. Capacitor 6 is part of the DC link. Since the operation of the DER and its converter is fully decoupled by the DC-link which does not affect the operation of the proposed topology, they are only represented by block "DER and Converter" in FIG. 1 for this circuit layout.

Figure 2:
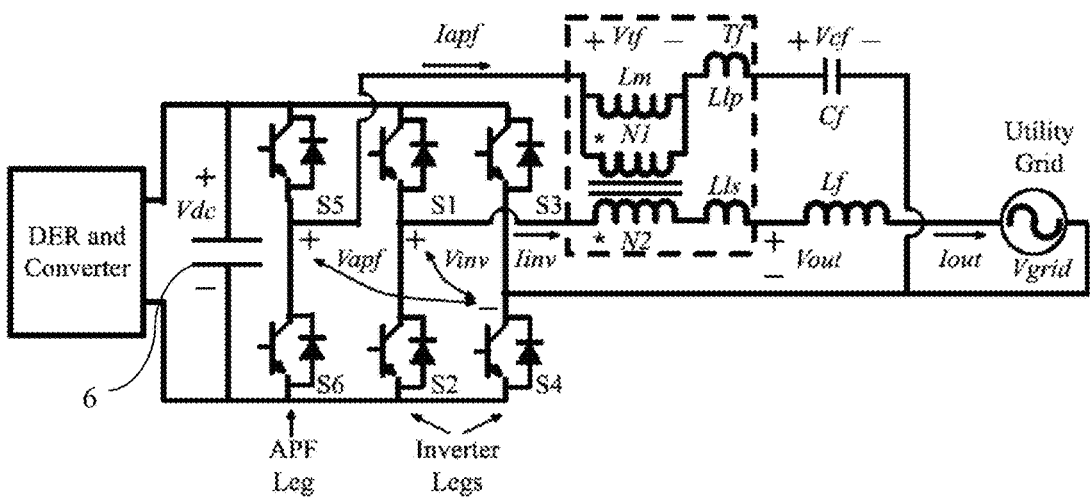
FIG. 2 is a circuit layout topology according to the embodiment of the present invention showing the equivalent circuit of the transformer.

In order to analyze the operation of the proposed topology, a more detailed circuit is shown in FIG. 2 where the high-frequency transformer $T_f$ is represented by its equivalent model with its magnetizing inductance $L_m$, its primary- and secondary-winding leakage inductance $L_{lp}$ and $L_{ls}$ (too small, neglected in following analysis), and an ideal transformer with a turn ratio of N1:N2=1:1. The voltages and currents are also labeled for operation explanation: $V_{dc}$ is the DC-link voltage, $V_{inv}$ and $I_{inv}$ represent the voltage and current from main inverter legs; $V_{apf}$ and $I_{apf}$ are the voltage and current from the APF leg; $V_{tf}$ and $V_{cf}$ or are the voltages across the transformer $T_f$ and the capacitor $C_f$, and $V_{out}$ and $I_{out}$ is the output voltage and current after active power filtering where the output voltage has a relationship of $V_{out}=V_{inv}-V_{tf}$ and $I_{out}$ is also known as the grid current; and $V_{grid}$ represents the utility grid. Here, the positive and negative signs represents the direction of the voltage in each component which also marks the positive energy direction when analyzing the proposed topology (Charging: Energy flow into positive side; Discharging: Energy flow out from positive side).

Figure 3:
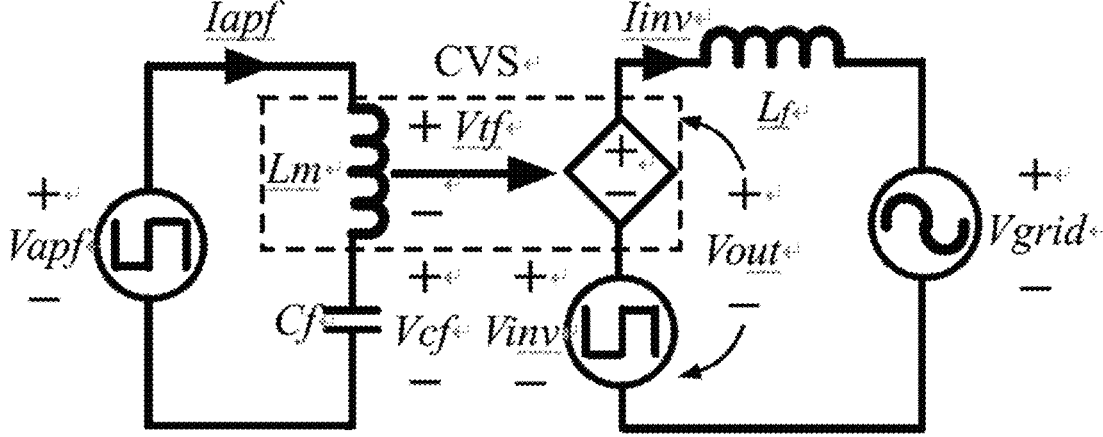
FIG. 3 is an equivalent circuit of the embodiment of the present invention showing the fundamental operating principles by depicting the relationships of voltages and currents.

Based on FIG. 2, the equivalent circuit of this inverter can be drawn in FIG. 3 where the proposed topology is divided into two parts: 1. The main circuit part which contains the voltage source $V_{inv}$ from main inverter legs, the utility $V_{grid}$, the grid filter $L_f$, and a controlled voltage source (CVS); and 2. The APF part which includes a voltage source $V_{apf}$ generated by the APF leg and an LC resonant circuit which contains the magnetizing inductance $L_m$ of the transformer and capacitor $C_f$. By charging and discharging the LC resonant circuit through proper control of the APF leg, the induced voltage $V_{tf}$ across the transformer can be controlled. This controlled voltage $V_{tf}$ is then used to counteract with the PWM pulses in $V_{inv}$ from the main inverter legs so that the total voltage ripples are reduced. With minimized voltage ripples in the circuit, the grid filter $L_f$ can therefore be reduced for the purposes of power density improvements.

Meanwhile, based on FIG. 3, the mathematical expression of the proposed inverter topology under ideal conditions can be formulated in equations (1) and (2) where (1) is the equation of the APF circuit with LC resonant circuit and (2) is the equation of the main circuit where $V_{c|t=0}$ is the initial capacitor voltage during each calculation period, and the transformer voltage is represented by $$V_{apf} = L_m \frac{dI_{apf}}{dt} + C_f \int_0^t I_{apf} dt + V_c \big|_{t=0} \tag{1}$$

$$\text{where } \begin{cases} V_{apf} = V_{dc}, & \text{Positive Charging} \\ V_{apf} = 0, & \text{Natural Discharging} \\ V_{apf} = -V_{dc}, & \text{Negative Charging} \end{cases}$$

$$L_f = \frac{dI_{inv}}{dt} = V_{inv} - \frac{N_1}{N_2} \frac{L_m * dI_{apf}}{dt} - V_{grid} \tag{2}$$

Based on (1) and (2), the inverter parameters $L_m$, $C_f$ and $L_f$ can be determined with an optimized performance of the proposed topology. Here $L_m$ and $C_f$ are selected with the following restrictions:

1. In order to maintain a relatively constant voltage across the transformer during each switching cycle in order to perform voltage interaction with the main inverter circuit, the resonant frequency of the LC circuit must be designed lower than the APF leg switching frequency.
2. Under restriction 1, the transformer and capacitor are also designed with minimized relative value for the size and power density considerations.
3. After and the selection of $L_m$ and $C_f$, the grid filter $L_f$ can then be determined using (2) based on the characteristic of $V_{tf}$, $V_{inv}$ and $V_{out}$.

In general, the operation principle of the proposed inverter topology lies with the voltage interaction between main inverter legs and the APF leg to minimize the total voltage ripple caused by the PWM pulses of the main inverter legs so that a smaller grid filter $L_f$ can be used at the cost of the additional switching devices and passive components. A detailed operation sequence with the circuit analysis will be provided in the next section.

As discussed above, the operation principle of the proposed inverter topology depends on the voltage interaction between the main circuit and the APF circuit. Below, a detailed circuit analysis of each switching state during one switching cycle is presented. The operation of the proposed topology in a switching period $T_s$ in a positive half grid cycle is shown in FIG. 4B-4E where the waveforms in one switching cycle are presented in FIG. 4A and current flow in each switching period are shown in FIGS. 4B-4E for detailed circuit analysis. Considering that the switching behaviors of S1-S4 in the main circuit are identical to a conventional H-bridge inverter, the circuit analysis in this section is mainly focused on the current flow in the APF circuit along with the voltage interaction between the main circuit and APF circuit. Here, the switching circuit in the negative half grid cycle has similar behavior to that shown in FIGS. 4B-4E.

In this disclosure, in one embodiment, the PWM pulses for S5-S6 in the APF leg are set with identical pulses to S1-S2 in the main inverter legs demonstrating the active power filtering capability of the proposed topology.

Figure 4A:
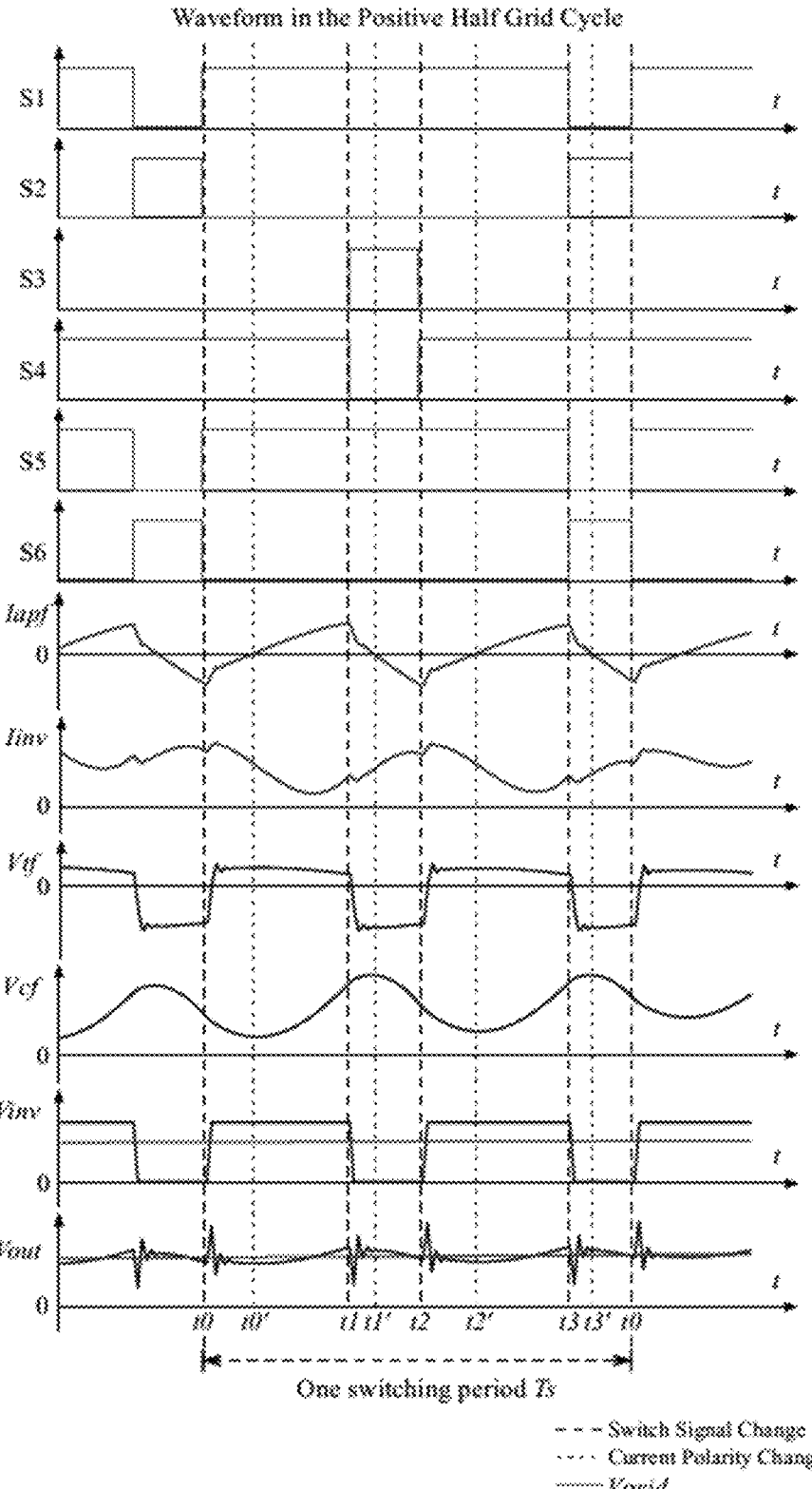
FIG. 4A depicts waveforms of gate controls of switches and voltages and currents according to an embodiment of the present invention for use with a circuit topology (shown in FIGS. 4B-4E) according to an embodiment of the present invention.

As shown in FIG. 4A, the switching circuit analysis in the positive half grid cycle can be separated into 4 parts (see FIGS. 4B-4E) based on the switching pulse combinations of S1-S6. In FIGS. 4B-4E, arrows 40 indicate the direction of current flow through the H-Bridge (main circuit) while arrows 42 indicate the direction of current flow in the active power filter circuitry. Arrows 40, 42 indicate an overlap in the current flow 40 and 42.

Figure 4B:
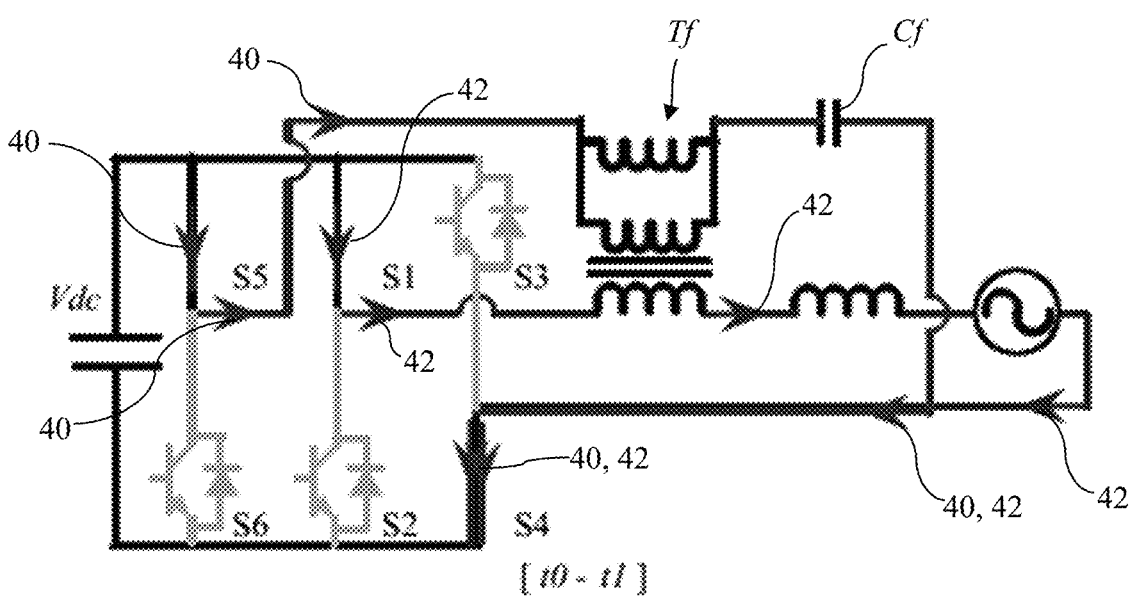
FIG. 4B depicts current flow in a circuit topology according to an embodiment of the present invention with switches S1, S4 and S5 turned on while switches S2, S3 and S6 are turned off.

Referring to FIG. 4B, [$t_0$–$t_1$]: At t=$t_0$, S1, S4 and S5 are turned ON while S2, S3 and S6 are turned OFF. The current flow in this period is shown in FIG. 4B where the DC-link is positively charging the transformer primary increasing this APF current $I_{apf}$. Meanwhile, the operation of the capacitor $C_f$ is separated by the polarity change of $I_{apf}$ at t=$t_0$', where the capacitor voltage $V_{cf}$ or is firstly witnessed with a reducing voltage due to negative $I_{apf}$ and then an increasing voltage after the current polarity change. During this period, a positive voltage $V_{tf}$ has been induced in the transformer secondary which counteracts with the inverter PWM voltage $V_{inv}$ from the main legs, thus reducing the ripples of the output voltage $V_{out}$.

Figure 4C:
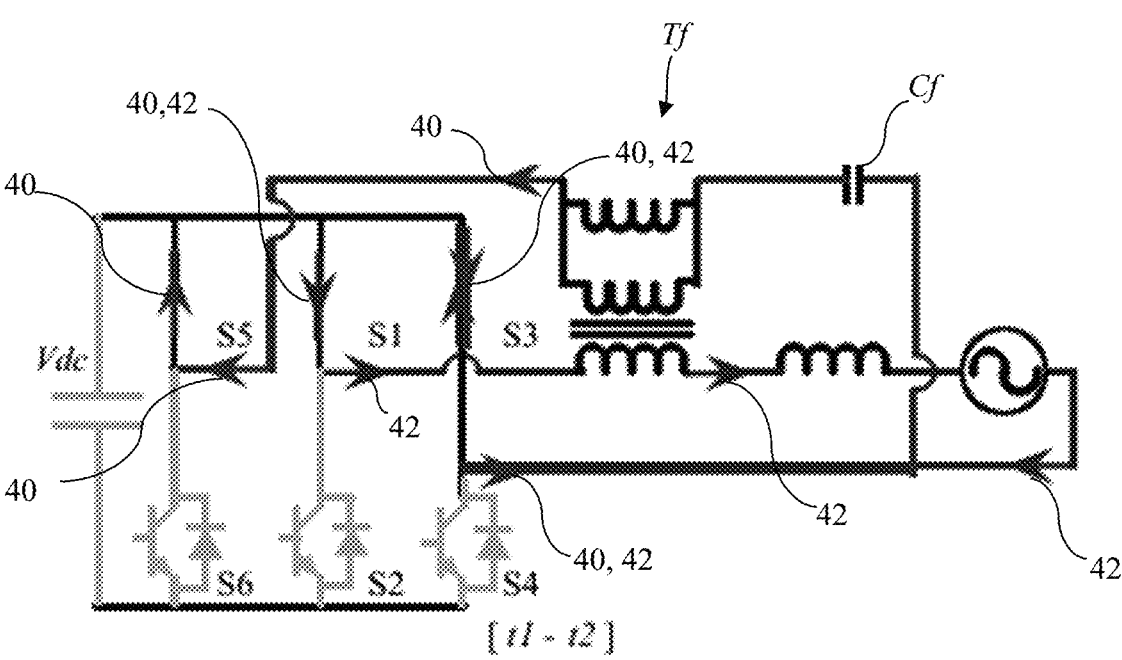
FIG. 4C depicts current flow in the circuit topology of FIG. 4B with switches S1, S3 and S5 turned on while switches S2, S4 and S6 are turned off.

Referring to FIG. 4C, [$t_1$–$t_2$]: At t=$t_1$, all the upper switches S1, S3 and S5 are turned ON while all the lower switches S2, S4 and S6 are turned OFF. During this period, as shown in FIG. 4C, the DC-link is disconnected from the circuit and the energy stored in the transformer starts naturally discharging as a LC resonant circuit. Similar to the duration of [$t_0$–$t_1$], the behavior of the capacitor voltage is also divided by the polarity change of $I_{apf}$ at t=$t_1$'. The capacitor voltage $V_{cf}$ is first charging by the transformer current with a reduced positive $I_{apf}$ and is then starts discharging to the transformer with negative $I_{apf}$. During this period, a negative voltage $V_{tf}$ is induced on the transformer secondary so that the output voltage $V_{out}$ is increased from 0V of $V_{inv}$ from inverter main legs, thus reducing the output voltage ripples.

Figure 4D:
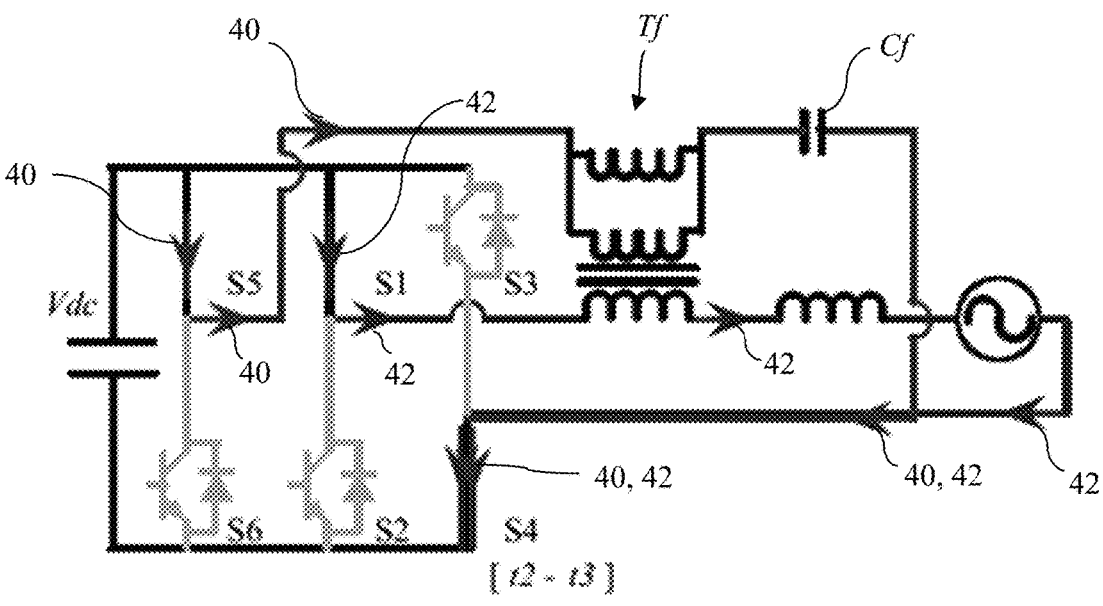
FIG. 4D depicts current flow in the circuit topology of FIG. 4B with switches S1, S4 and S5 turned on while switches S2, S3 and S6 are turned off.

Referring to FIG. 4D, [$t_2$–$t_3$]: At t=$t_2$, S1, S4, S5 are turned ON while S2, S3, S6 are turned OFF. As shown in FIG. 4D, the behavior of all the voltages and currents in this period is identical to that in [$t_0$–$t_1$].

Figure 4E:
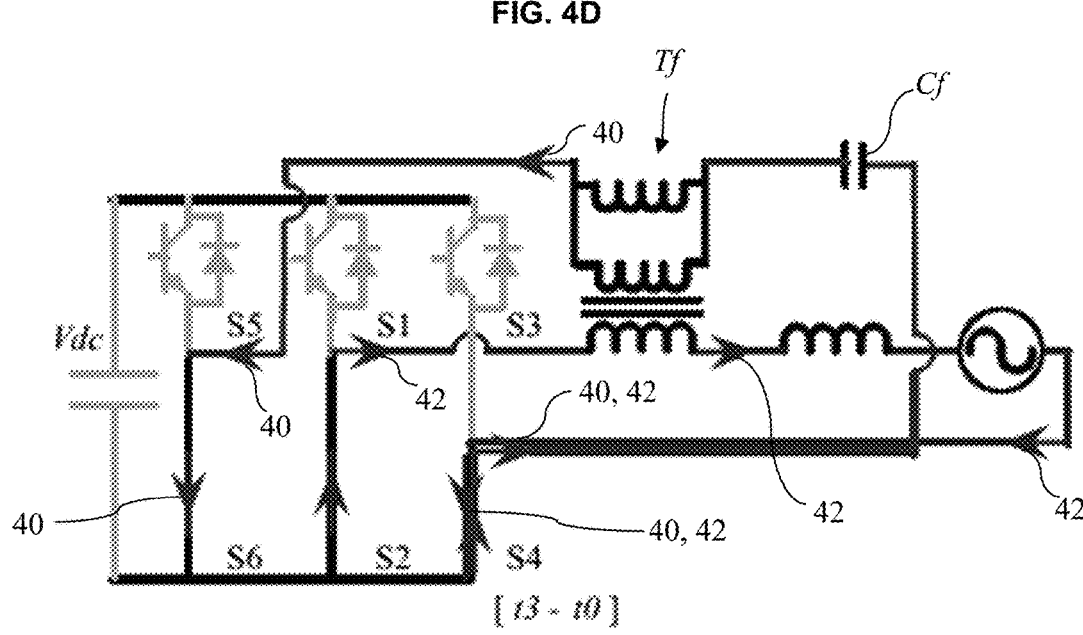
FIG. 4E depicts current flow in the circuit topology of FIG. 4B with switches S2, S4 and S6 turned on while switches S1, S3 and S5 are turned off.

Referring to FIG. 4E, [$t_3$–$t_0$]: At t=$t_3$, all the upper switches S1, S3 and S5 are turned OFF while all the lower switches S2, S4 and S6 are turned ON. As shown in FIG. 4E, the DC-link is also disconnected from the circuit while the transformer is naturally discharging to this LC circuit. Separated by the change of polarity of $I_{apf}$ at t=$t_3$', the capacitor $C_f$ is first charged by a reduced positive $I_{apf}$ and is then discharged with an increased negative $I_{apf}$. During this period, a negative $V_{tf}$ is induced on the transformer secondary resulting in an increased in $V_{out}$ from 0V of $V_{inv}$ generated by inverter main legs.

In general, by charging and discharging of the transformer and capacitor in the APF circuit, a desired $V_{out}$ can be generated by the interaction of the transformer voltage $V_{tf}$ and inverter PWM voltage $V_{inv}$. As shown by $V_{inv}$, $V_{out}$, and $V_{grid}$ in FIG. 4A, high frequency pulses have been reduced and thus a small grid filter $L_f$ can be used to filter out these high frequency ripples.

Figure 5:
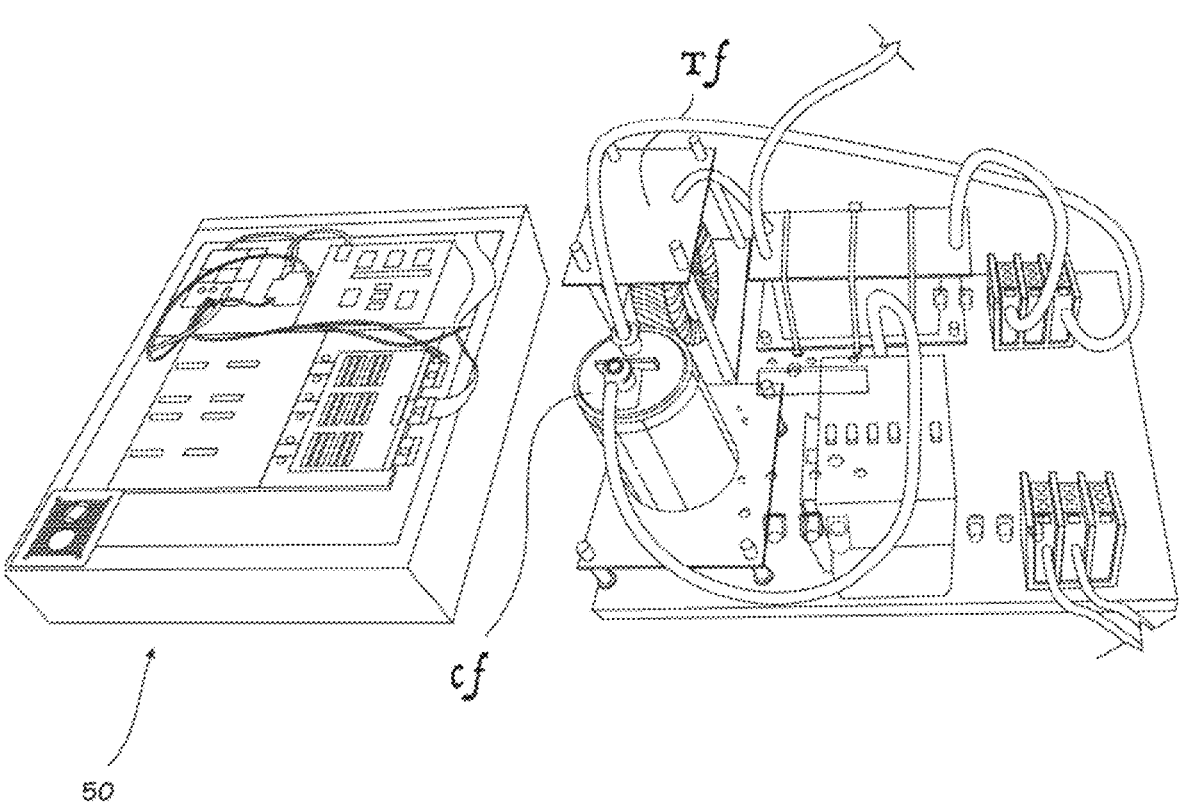
FIG. 5 is a photograph of a 3-Leg inverter prototype according to an embodiment of the present invention, used in experimental verification.

In order to verify the performance of the proposed topology, simulation and experimental verifications were carried out where the simulation comparison is made between the proposed topology and a reference H-bridge inverter with L-type filter on a MATLAB/SIMULINK platform while the experimental verification was performed on a 3-leg inverter prototype. The system parameters used in both simulation and experimental verifications are shown in Table I. Meanwhile, the inverter prototype in one embodiment used in experimental tests is shown in FIG. 5 with the circuitry 50 including the control circuit 100, the H-Bridge and APF 94. Here, all the waveforms in the experimental tests were captured by a HIOKI 8860-50 Memory HiCorder and the current THD was captured by a Fluke 43B Power Quality Analyzer. Here, in both simulation and experimental verifications, only the topology circuits are put to the tests and all controllers are maintained identical.

TABLE I

| SYSTEM PARAMETERS IN SIMULATION AND EXPERIMENTAL VERIFICATION | |
| --- | --- |
| General Parameter | Value |
| Grid voltage $V_{grid}$ | 240 Vrms |
| Nominal grid frequency | 60 Hz |
| DC-link voltage $V_{dc}$ | 400 V |
| Switching frequency | 10 kHz |
| Control interval | 10 µs |
| Operation Current Reference | 18.18 Arms |
| Parameter of Proposed Inverter | |
| Transformer mutual inductance $L_m$ | 0.2 mH |
| Transformer primary-side leakage inductance $L_{lp}$ | 10 µH |
| Transformer secondary-side leakage inductance $L_{ls}$ | 10 µH |
| Transformer turn ratio N1:N2 | 1:1 |
| Capacitor $C_f$ | 4 µF |
| Grid filter $L_f$ | 0.2 mH |
| Parameter of Reference Inverter | |
| Grid filter $L_f$ | 1.0 mH |

Simulation results using both the proposed topology and the reference topology are presented where the waveforms of the proposed topology are presented in FIG. 6 and the waveforms of the reference topology are shown in FIG. 7. Here in the simulation results, the calculated THD is tuned for a summation up to 51$^{st}$ harmonic order as required by grid integration standards [8], [9].

Figure 6A:
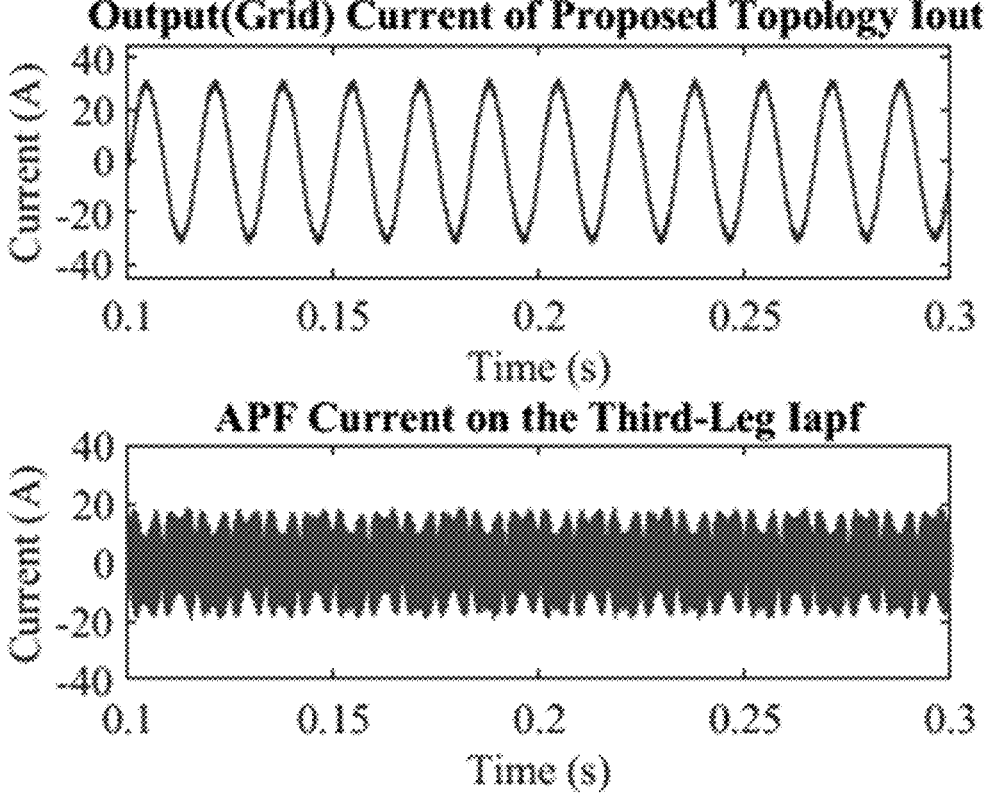
FIG. 6A are graphs of simulation waveforms for output (grid) current and APF current for the circuit topology of FIGS. 4B-4E.
Figure 6B:
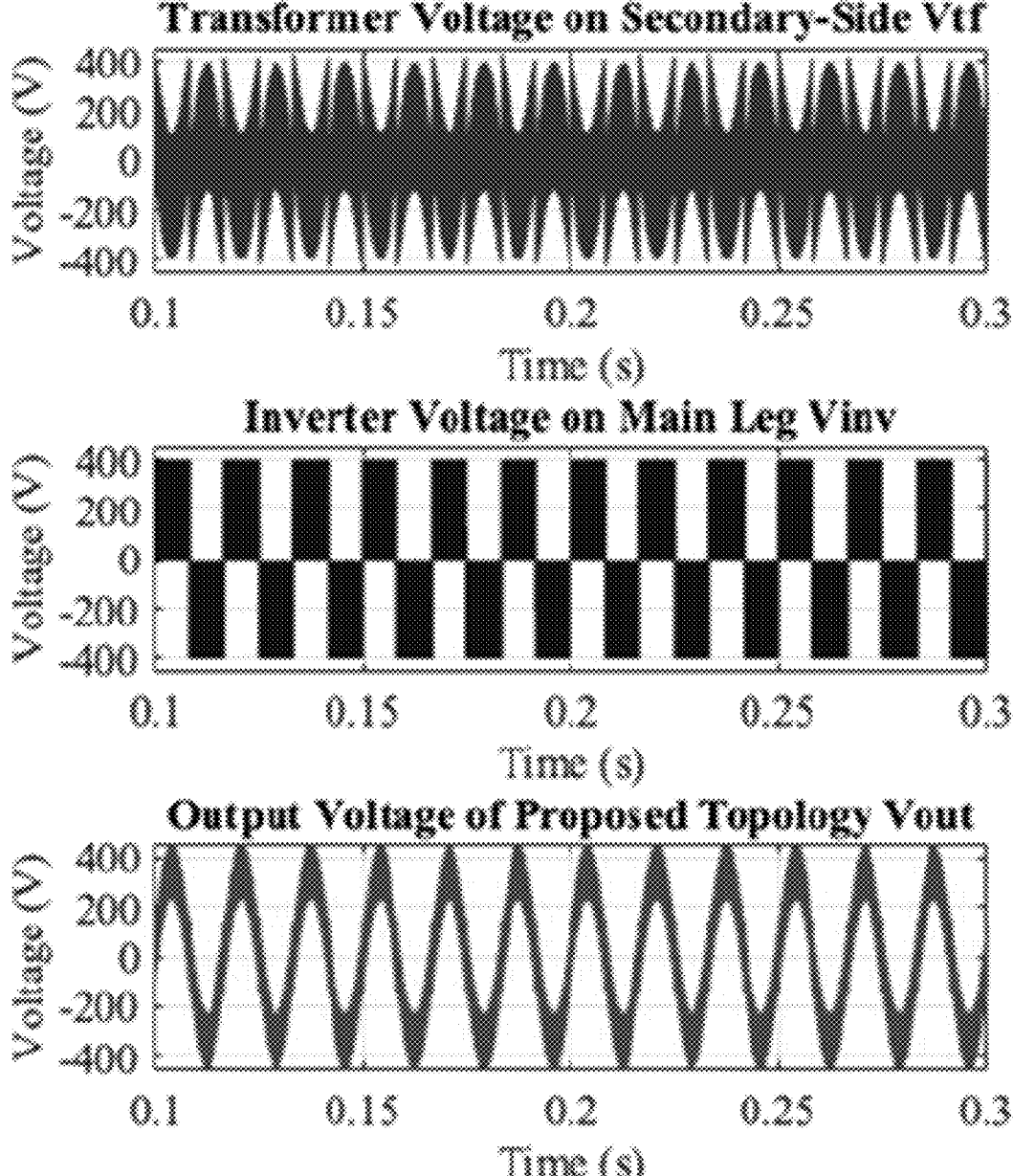
FIG. 6B are graphs of simulation waveforms for transformer voltage, inverter voltage and output voltage for the circuit topology of FIGS. 4B-4E.
Figure 6C:
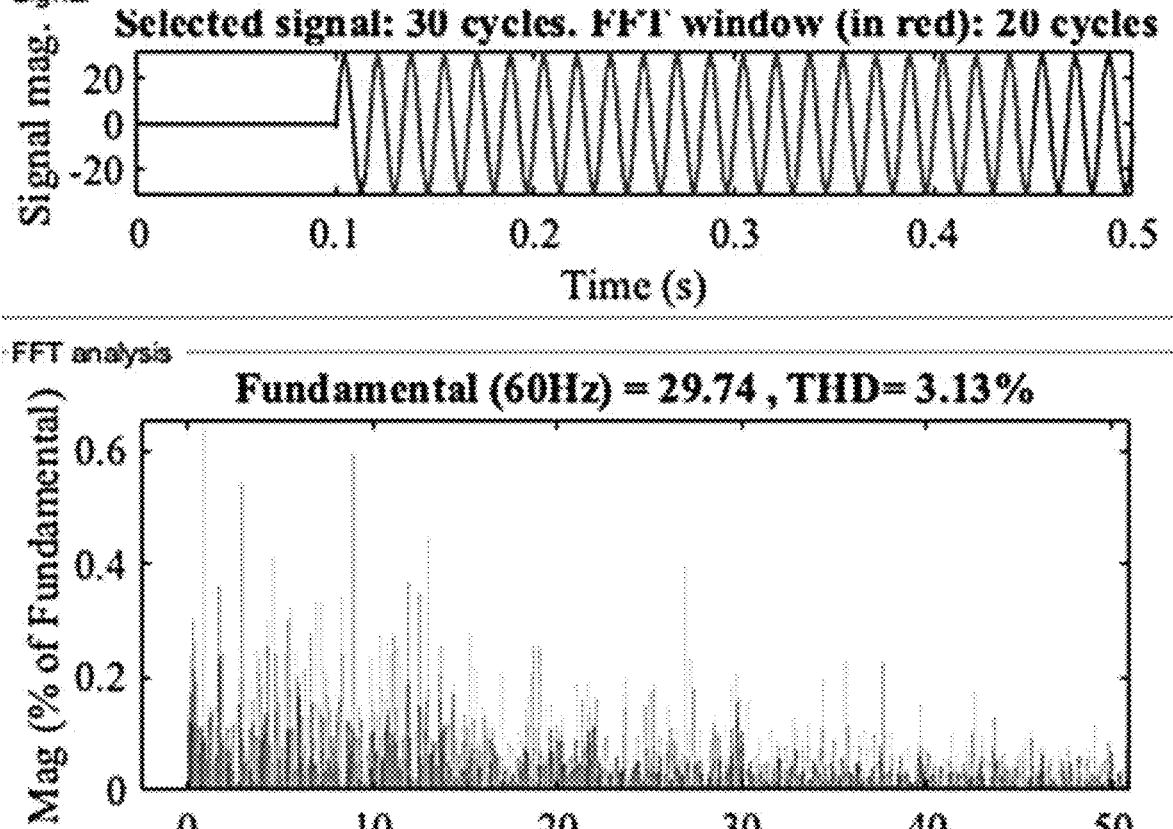
FIG. 6C are graphs of simulation waveforms for grid current THD for the circuit topology of FIGS. 4B-4E.
Figure 7A:
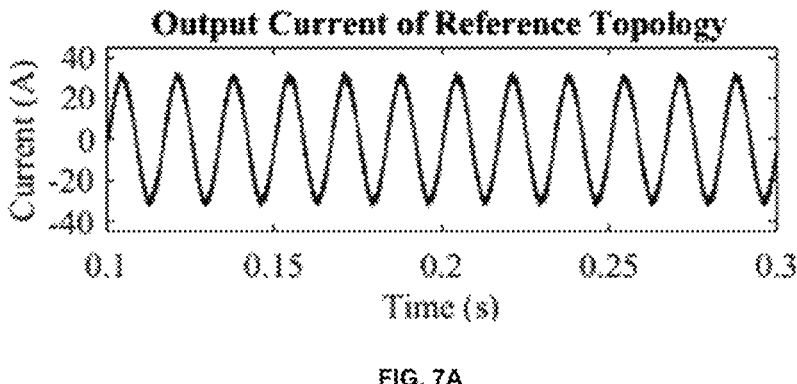
FIG. 7A is a graph of simulation waveforms of output (grid) current for a reference circuit topology with a passive power filter.
Figure 7B:
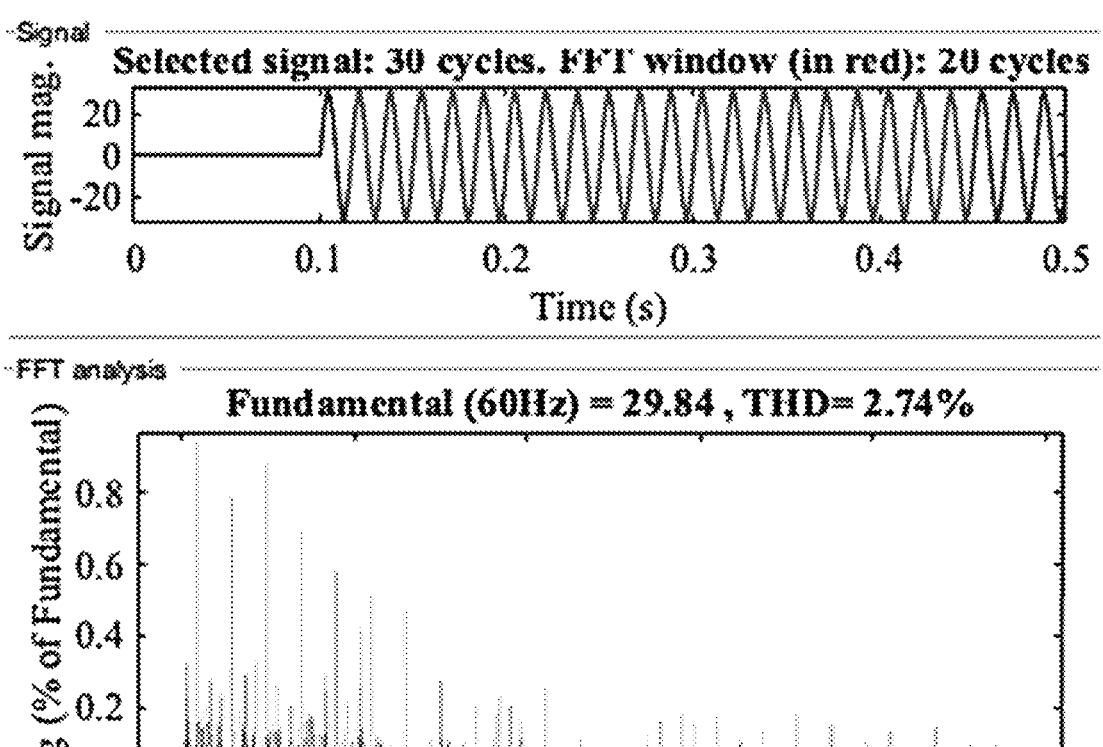
FIG. 7B is a graph of simulation waveforms of grid current THD for a reference circuit topology with a passive power filter.

As shown in the simulation waveforms in FIG. 6A and FIG. 6B of the proposed topology, by charging and discharging the APF circuit, a periodical voltage $V_{tf}$ can be induced across the transformer which then counteracts with the voltage of the main legs $V_{inv}$ to cancel out the output voltage ripples. The combined voltage $V_{out}$ of the proposed topology, as illustrated in FIG. 6B, has shown with a sinusoidal characteristic with small voltage ripples compared to $V_{inv}$ from the main inverter leg. Therefore, a small grid filter $L_f$ can be used in the proposed topology. The grid current THD analysis is shown in FIG. 6C which has a THD level of 3.13% which is within the 5% limit set by grid standards. Meanwhile, the simulation results of the reference topology are shown in FIG. 7. Under identical operation conditions, this reference topology using a conventional H-bridge inverter with an L-type filter has an overall current THD of 2.74%.

In general, according to the above simulation comparison between the proposed topology and reference topology in FIG. 6A-6C and FIG. 7A-7B, the proposed topology has similar current performance (THD 3.13%) with the reference topology (THD 2.74%) while it has significantly reduced the inductance required for the filtering operation (0.4 mH of proposed topology vs 1.0 mH of reference topology).

Figure 8A:
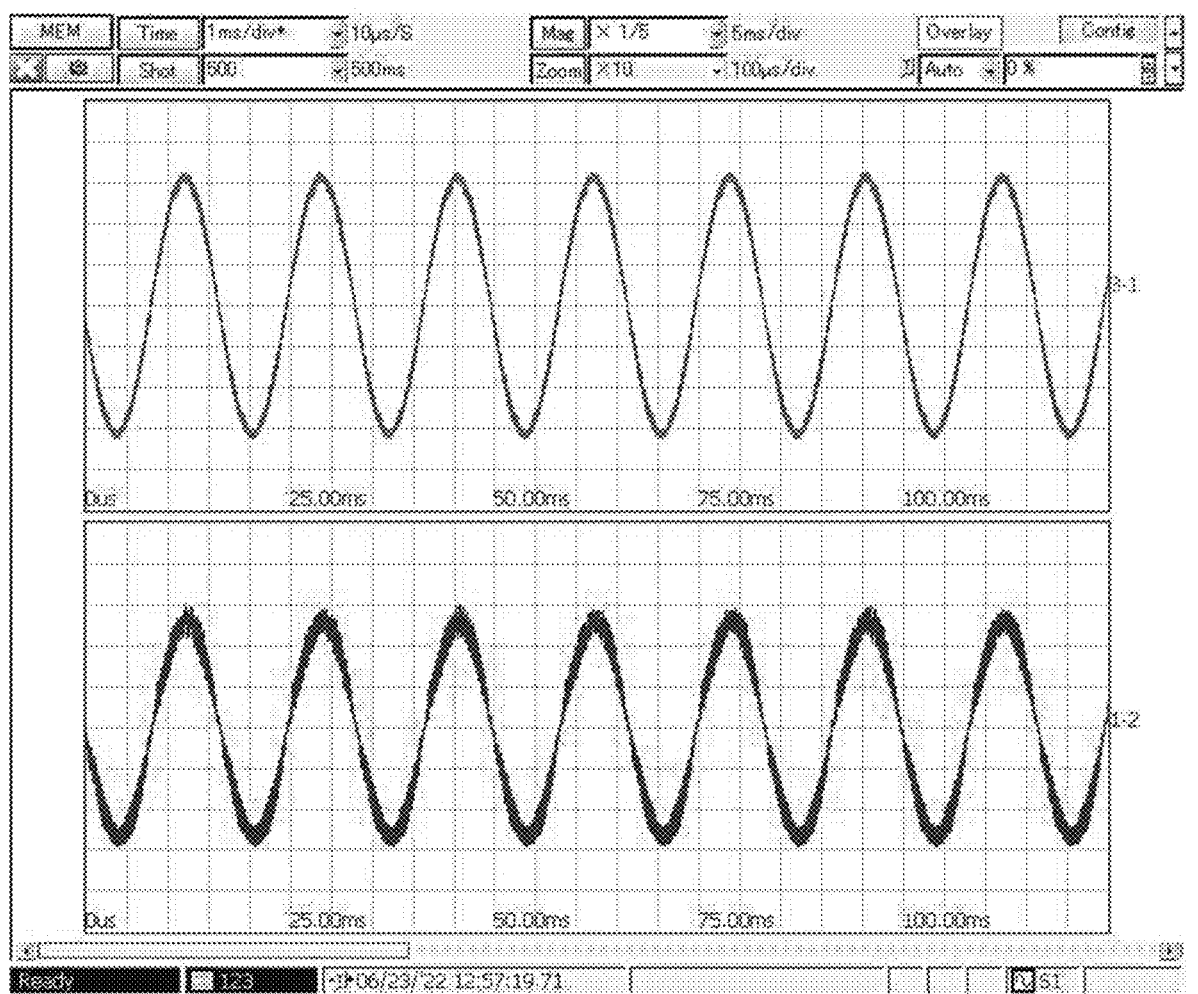
FIG. 8A is a graph of waveforms of measured grid voltage and current for a 3-Leg inverter prototype.
Figure 8B:
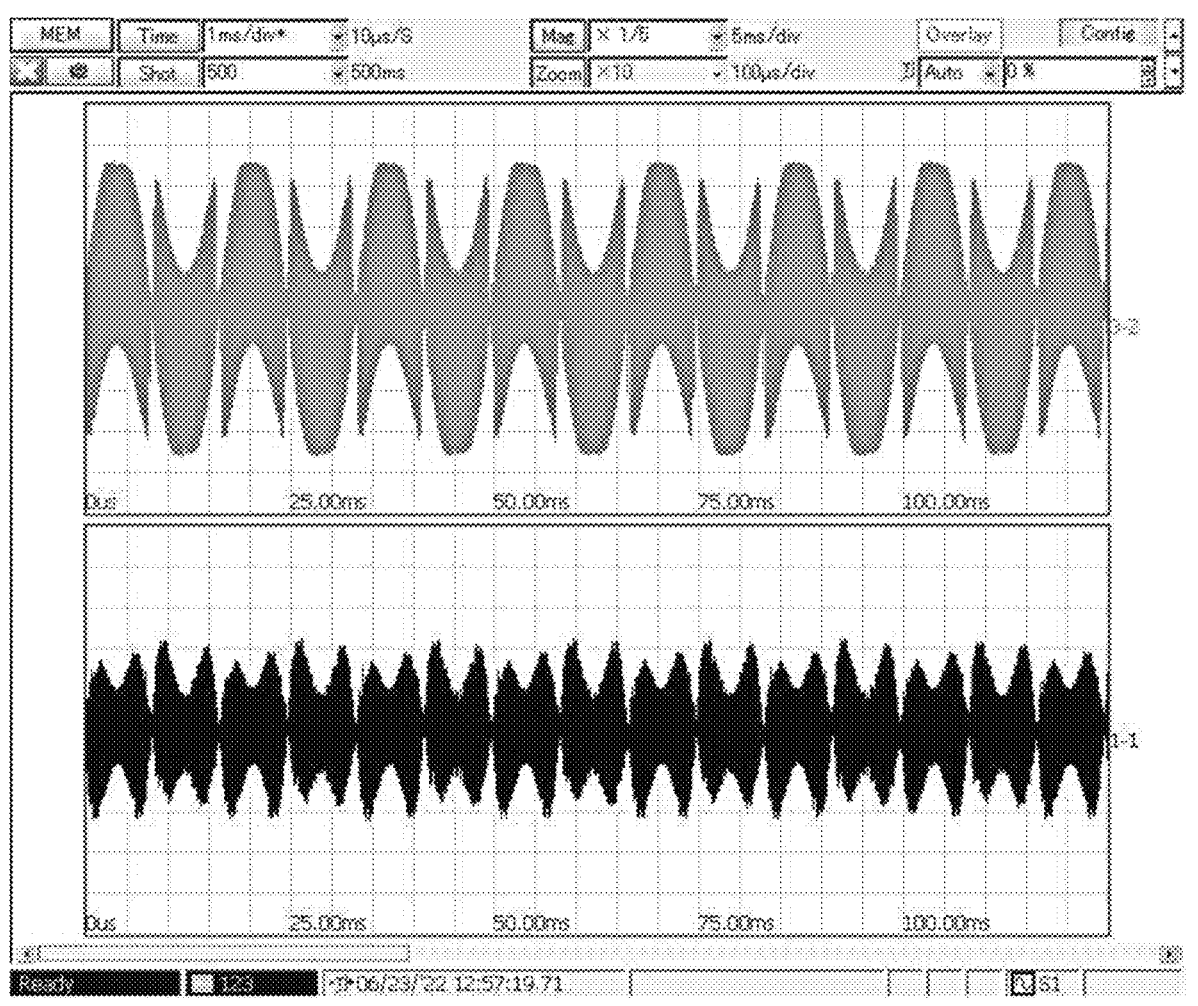
FIG. 8B is a graph of waveforms of measured transformer voltage and APF current for a 3-Leg inverter prototype.
Figure 8C:
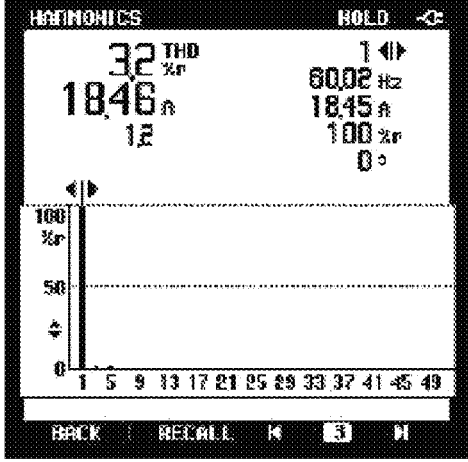
FIG. 8C are graphs of grid voltage THD and grid current THD for a circuit topology according to an embodiment of the present invention.

Experimental results of the proposed topology are presented in FIG. 8 where FIG. 8A shows the waveforms of grid voltage and current, FIG. 8B shows the voltage induced across the transformer and the current in the APF leg, and FIG. 8C shows the THD performance of the grid voltage and current.

As shown in FIG. 8, both the voltages and currents in the experiment prototype have agreed with the simulation results in FIG. 6 which verify the circuit analysis above. Meanwhile, even though the inductance of the grid filter is reduced to 0.4 mH, the proposed topology can still maintain a current THD of 3.2%, as illustrated in FIG. 8C.

In general, both the simulation and experiments results have verified the effectiveness of the proposed 3-leg inverter topology which can maintain a low current THD while minimizing the passive filter required for the filtering of the PWM pulses.

Based on the simulation and experimental results above, the effectiveness of the proposed topology has been verified.

REFERENCES

[1] IRENA (2019), *Global energy transformation: A roadmap to* 2050 (2019 edition), International Renewable Energy Agency (IRENA), Abu Dhabi.

[2] A. Jäger-Waldau, *PV Status Report* 2019, EUR 29938 EN, Publications Office of the European Union, Luxembourg, 2019, ISBN 978-92-76-12608-9, doi: 10.2760/326629, JRC118058.

[3] IRENA (2021), *Renewable capacity statistics* 2021, International Renewable Energy Agency (IRENA), Abu Dhabi

[4] IRENA (2015), *Battery Storage for Renewables: Market Status and Technology Outlook*, International Renewable Energy Agency (IRENA), Ruud Kempener (IRENA) and Eric Borden.

[5] IEA (2021), *Global EV Outlook* 2021, IEA, Paris https://www.iea.org/reports/global-ev-outlook-2021.

[6] B. Mirafzal and A. Adib, "On Grid-Interactive Smart Inverters: Features and Advancements," *IEEE Access, vol.* 8, pp. 160526-160536, September 2020.

[7] M. Bajaj and A. K. Singh, "Grid Integrated Renewable DG Systems: A Review of Power Quality Challenges and State-of-the-Art Mitigation Techniques," *Int. J. Energy Res., vol.* 44, no. 1, pp. 26-69, January 2020.

[8] Underwrit. Lab., *UL* 1741 *Supplement SA: Grid Support Utility Interactive Inverters and Converters*, 2016.

[9] IEEE 1547-2018*: IEEE Standard for Interconnection and Interoperability of Distributed Energy Resources with Associated Electric Power Systems Interfaces*, IEEE Std 1547, 2018.

[10] Y. Liu, K.-Y. See, S. Yin, R. Simanjorang, C. F. Tong, A. Nawawi and J.-S. Lai., "LCL Filter Design of a 50-kW 60-KHz SiC Inverter with Size and Thermal Considerations for Aerospace Applications," *IEEE Trans. Ind. Electron.*, vol. 64, no. 10, pp. 8321-8333 October 2017.

[11] D. Solatialkaran, K. G. Khajeh, and F. Zare, "A Novel Filter Design Method for Grid-Tied Inverters," *IEEE Trans. Power Electron.*, vol. 36, no. 5, pp. 5473-5485 May 2021.

[12] S. Jayalath and M. Hanif, "Generalized LCL-Filter Design Algorithm for Grid-Connected Voltage-Source Inverter," *IEEE Trans. Ind. Electron.*, vol. 64, no. 3, pp. 1905-1915 March 2017.

[13] D. Solatialkaran, F. Zare, T. K. Saha, and R. Sharma, "A Nove Approach in Filter Design for Grid-Connected Inverters Used in Renewable Energy Systems," *IEEE Trans. Sustain. Energy*, vol. 11, no. 1, pp. 154-164, January 2020.

[14] S. Jiang, Y. Liu, Z. Mei, J. Peng, and C. M. Lai, "A Magnetic Integrated LCL-EMI Filter for a Single-Phase SiC-MOSFET Grid-Connected Inverter," *IEEE J. Emerg. Sel. Top. Power Electron.*, vol. 8, no. 1, pp. 601-617, March 2020.

[15] Y. Yang, "A Design of PWM Inverter Passive Filter Based on CM Transformer," *CPSS Trans. Power Electron. Appl.*, vol. 5, no. 2, pp 180-190, June 2020.

[16] J. Koppinen, F. M. M. Rahman, and M. Hinkkanen, "Effects of the Switching Frequency of a Grid Converter on the LCL Filter Design," in 8*th IET International Conference on Power Electronics, Machines and Drives (PEMD* 2016), Glasgow, UK, April 2016.

[17] Y. Zhang, H. Li, and Y. Shi, "Electromagnetic Interference Filter Design for a 100 KW Silicon Carbide Photovoltaic Inverter Without Switching Harmonics Filter," *IEEE Trans. Ind. Electron.*, vol. 69, no. 7, pp. 6925-6934 July 2022.

[18] W. Chen, X. Yang, and Z. Wang, "An Active EMI Filtering Technique for Improving Passive Filter Low-Frequency Performance," *IEEE Trans. Electromagn. Compat.*, vol. 48, no. 1, pp. 172-177, February 2006.

[19] Y. Chu and Y. Ramadass, "Active EMI Filters to Reduce Size and Cost of EMI Filters in Automotive ystems," *Power Analog Des. J.*, ADJ 3Q, pp. 1-5, 2021.

[20] S. Jiang, Y. Liu, W. Liang, J. Peng, and H. Jiang, "Active EMI Filter Design with a Modified LCL-LC Filter for Single-Phase Grid-Connected Inverter in Vehicle-to-Grid Application," *IEEE Trans. Veh. Technol.*, vol. 68, no. 11, pp. 10639-10650, November 2019.

[21] S. Ogasawara, H. Ayano, and H. Akagi, "An Active Circuit for Cancellation of Common-Mode Voltage Generated by a PWM Inverter," *IEEE Trans. Power Electron.*, vol. 13, no. 5, pp. 835-841, September 1998

[22] S. Ohara, S. Ogasawara, M. Takemoto, K. Orikawa, and Y. Yamamoto, "An Active Common-Noise Canceler Combined with Feedback Control," *Electron. Commun. Japan*, vol. 104, no. 2, p. e12305, June 2021.

[23] L. Wang, Y. Shi, and H. Li, "Anti-EMI Noise Digital Filter Design for a 60-KW Five-Level SiC Inverter Without Fiber Isolation," *IEEE Trans. Power Electron.*, vol. 33, no. 1, pp. 13-17, January 2018.

[24] G. D. S. Fischer, A. Mengatto, L. G. Kremer, and M. Mezaroba, "A Control Strategy for a Series APF with Critical-Load-Bus Voltage Feedback That Avoids Injection Transformer Saturation," *IEEE Trans. Ind. Appl.*, vol. 55, no. 3, pp. 2290-2299 May 2019.

[25] W. H. Ko and J. C. Gu, "Impact of Shunt Active Harmonic Filter on Harmonic Current Distortion of Voltage Source Inverter-Fed Drives," *IEEE Trans. Ind. Appl.*, vol. 52, no. 4, pp. 2816-2825 July 2016.

[26] S. Devassy and B. Singh, "Design and Performance Analysis of Three-Phase Solar PV Integrated UPQC," *IEEE Trans. Ind. Appl.*, vol. 54, no. 1, pp. 73-81, January 2018.

What is claimed is:

1. A single-phase voltage source inverter comprising:

a main inverter circuit connected to an active power filter circuit;

the main inverter circuit comprising an H-bridge circuit comprising a first leg and a second leg, the first leg comprising a first switch, a second switch, and the second leg comprising a third switch and a fourth switch;

the active power filter circuit comprising a third leg comprising a fifth switch and a sixth switch;

the main inverter circuit connected to a secondary side of a high frequency transformer and a grid filter in series, and adapted to be connected to an AC load;

a primary of the high frequency transformer and a capacitor connected in series to the active power filter leg and an H-bridge leg.

2. A method of power filter reduction using the inverter of claim 1, comprising:

charging and discharging the high frequency transformer primary and the capacitor by controlling the switches of the active power filter circuit to generate an induced voltage on the transformer secondary which is in opposite phase with the pulses generated by the switches of the main inverter circuit.

3. The method of power filter reduction of claim 2, wherein charging and discharging the active power filter circuit comprise the steps of the first, fourth and fifth switches turned on and the second, third and sixth switches turned off; followed by the first, third and fifth switches turned on and the second, fourth and sixth switch turned on, followed by the first, fourth and fifth switches turned on and the second, third and sixth switches turned off, followed by the first, third and fifth switches turned off and the second, fourth and sixth switched turned on.

* * * * *